United States Patent
Bijwe et al.

(10) Patent No.: US 10,178,635 B1
(45) Date of Patent: Jan. 8, 2019

(54) METHOD AND APPARATUS FOR PREVENTING CLUSTER FRAGMENTATION IN A NEIGHBOR AWARENESS NETWORKING (NAN) SYSTEM

(71) Applicant: Marvell International Ltd., Hamilton (BM)

(72) Inventors: Sagar D. Bijwe, Maharashtra (IN); Paul Lambert, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 188 days.

(21) Appl. No.: 15/188,210

(22) Filed: Jun. 21, 2016

Related U.S. Application Data (60) Provisional application No. 62/183,340, filed on Jun. 23, 2015.

(51) Int. Cl.
| | |
|---|---|
| *H04L 12/28* | (2006.01) |
| *H04W 56/00* | (2009.01) |
| *H04B 17/318* | (2015.01) |
| *H04W 8/00* | (2009.01) |
| *H04W 52/02* | (2009.01) |
| *H04W 84/18* | (2009.01) |

(52) U.S. Cl.
CPC ........ *H04W 56/001* (2013.01); *H04B 17/318* (2015.01); *H04W 8/005* (2013.01); *H04W 52/0216* (2013.01); *H04W 84/18* (2013.01)

(58) Field of Classification Search
CPC . H04W 8/005; H04W 52/0216; H04W 84/18; H04W 56/001; H04B 17/318
USPC ........................................................ 370/254
See application file for complete search history.

(56) References Cited

U.S. PATENT DOCUMENTS

| | | | | |
|---|---|---|---|---|
| 9,642,136 | B2* | 5/2017 | Du | H04W 56/0015 |
| 9,888,438 | B2* | 2/2018 | Fang | H04W 48/18 |
| 2016/0277914 | A1* | 9/2016 | Kim | H04W 8/005 |
| 2016/0286574 | A1* | 9/2016 | Abraham | H04L 63/065 |
| 2016/0330701 | A1* | 11/2016 | Kim | H04W 8/005 |

* cited by examiner

*Primary Examiner* — Faisal Choudhury (57) ABSTRACT

Embodiments include a method that includes receiving, by a first device, a first synchronization beacon frame over a first communication channel, wherein the first device is configured to receive synchronization beacon frames over the first communication channel and a second communication channel; indicating, by the first device, that the first synchronization beacon frame received over the first communication channel is not to be considered while determining a state of the first device; and indicating, by the first device, that any synchronization beacon frame received over the second communication channel is to be considered while determining the state of the first device.

20 Claims, 6 Drawing Sheets

METHOD AND APPARATUS FOR PREVENTING CLUSTER FRAGMENTATION IN A NEIGHBOR AWARENESS NETWORKING (NAN) SYSTEM

CROSS REFERENCE TO RELATED APPLICATIONS

This disclosure claims priority to U.S. Provisional Patent Application No. 62/183,340, filed on Jun. 23, 2015, which is incorporated herein by reference in its entirety.

TECHNICAL FIELD

Embodiments of the present disclosure relate to a Neighbor Awareness Networking (NAN) system, and in particular to preventing cluster fragmentation in a NAN system.

BACKGROUND

A Neighbor Awareness Networking (NAN) system is a logical communication network that focuses on communication among wireless devices in close proximity. Unlike local area networks (LANs), in which the devices are in the same network segment and share the same broadcast domain, the devices in a NAN can belong to different proprietary network infrastructures (e.g., different enterprise networks). To communicate over the NAN, a device may use the WiFi alliance standard.

In a NAN topology, multiple NAN devices (e.g., computing devices that operate in accordance with the NAN protocol) can form a NAN cluster. The NAN cluster is a collection of the NAN devices that share a common set of NAN parameters and are synchronized to a same discovery window schedule. It is desirable that a NAN cluster, once formed, is not unintentionally fragmented.

SUMMARY

In various embodiments, the present disclosure provides a method that includes receiving, by a first device, a first synchronization beacon frame over a first communication channel, wherein the first device is configured to receive synchronization beacon frames over the first communication channel and a second communication channel; indicating, by the first device, that the first synchronization beacon frame received over the first communication channel is not to be considered while determining a state of the first device; and indicating, by the first device, that any synchronization beacon frame received over the second communication channel is to be considered while determining the state of the first device.

In various embodiments, the present disclosure also provides a device comprising: a first communication interface configured to receive a first synchronization beacon frame over a first communication channel; a second communication interface configured to receive a second synchronization beacon frame over a second communication channel; and a state determination module configured to determine a state of the device, wherein the state determination module is configured to not consider the first synchronization beacon frame received over the first communication channel while determining the state of the device, and wherein the state determination module is configured to consider the second synchronization beacon frame received over the second communication channel while determining the state of the device.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

DETAILED DESCRIPTION

Figure 1:
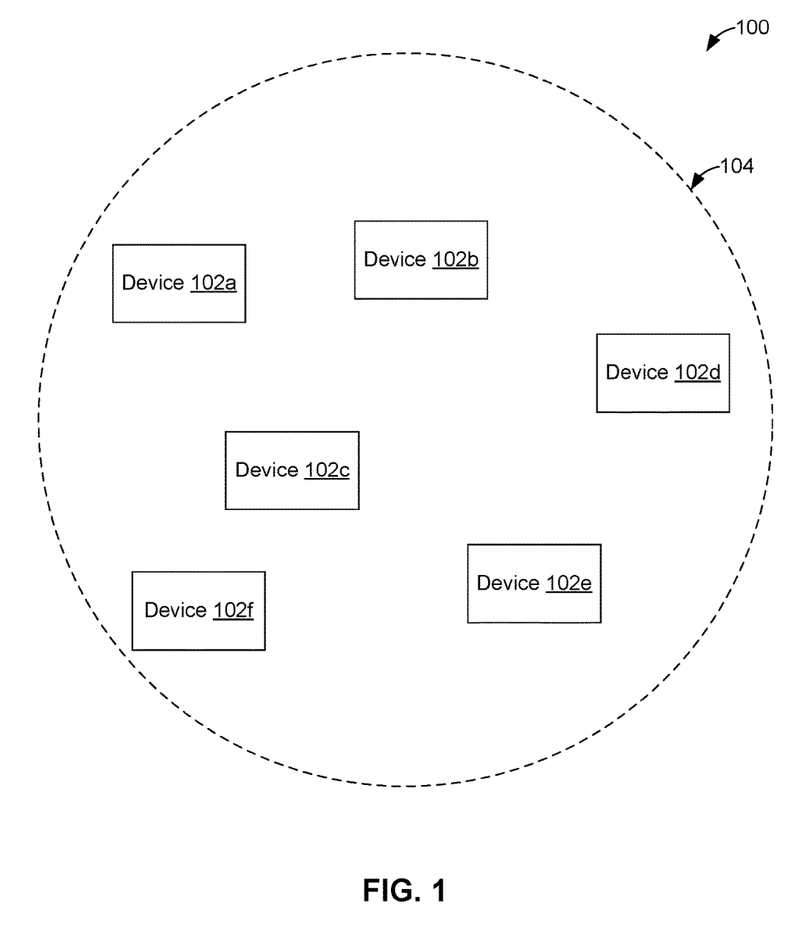
FIG. 1 illustrates a NAN network comprising a plurality of computing devices.

FIG. 1 illustrates a NAN network 100 comprising a plurality of computing devices 102a, . . . , 102f. In an embodiment, the computing devices 102a, . . . , 102f (generally referred to as devices 102, and also as NAN devices 102) are arranged within a NAN cluster 104 (illustrated using dotted lines). As used herein, any references to devices 102 may indicate one or more of devices 102a, 102b, 102c, 102d, 102e, and 102f.

Individual ones of the computing devices 102 are Wi-Fi capable devices supporting all required NAN protocol mechanisms. For example, individual ones of the computing devices 102 can be any computing device that can participate in a NAN network, e.g., a cellular phone, a smart phone, a laptop, a desktop, a handheld computing device, an access point, and/or any other consumer electronic device. In an example, the NAN network 100 is built upon the interaction of the devices 102 grouped in the NAN cluster 104. The NAN cluster 104 can be automatically created by nearby NAN devices that cooperate to synchronize to a common discovery window (DW) schedule. During that DW, all NAN devices participating in the NAN cluster 104 are allowed to exchange service frames describing or requesting a service.

In an example, the devices 102 can belong to different proprietary network infrastructures (e.g., different enterprise networks). The devices 102, for example, use the WiFi alliance standard to communicate with each other. For example, as discussed in further detail herein later, in the NAN cluster 104, the devices 102 can communicate in the 2.4 GHz frequency band and/or in the 5 GHz frequency band. For example, a device 102a can communicate with another device 102b in the NAN network 100 over a first communication channel and/or a second communication channel, where the first communication channel comprises the 2.4 GHz frequency band and the second communication channel comprises the 5 GHz frequency band.

In an example, the devices 102 are configured to discover NAN clusters (e.g., the NAN cluster 104) with relatively low power consumption. Also, the devices 102 in the NAN cluster 104 synchronize their respective clocks in order to maintain alignment of DWs and be able to exchange service discovery frames. Thereby, devices 102 in the NAN cluster 104 periodically transmit discovery beacon frames and synchronization beacon frames.

In a NAN cluster (e.g., the NAN cluster 104 of FIG. 1), at least one of the participating NAN devices may be configured as an anchor master. In one example, the device 102a is the anchor master. In addition to the anchor master, one or more devices in a NAN cluster may be configured as master devices, one or more devices may be configured as non-master synchronization devices (also referred to as non-master sync devices), and/or one or more devices may be configured as non-master non-synchronization devices (also referred to as non-master non-sync devices). In one example, the device 102b can act as a master device, the device 102c can act as a non-master sync device, and the device 102d can act as a non-master non-sync device. As discussed in further detail herein later, a device may have a state that can be configured to transition between an anchor master state, a master state, a non-master sync state, and/or a non-master non-sync state.

To achieve synchronization in the NAN cluster 104, all the devices 102 have to follow the same clock source. The anchor master of the NAN cluster is responsible for maintaining the synchronization used to align a DW for service discovery functions. In an example, all devices in the NAN cluster 104 follow the time reference of the anchor master based on the devices' respective Time Synchronization Function (TSF). In one example, the anchor master periodically transmits beacon frames that include information associated with the TSF that the anchor master maintains. Even if the NAN cluster 104 temporarily has different anchor masters, the procedures of the NAN protocol ensure that the NAN cluster 104 always converges to having only one anchor master.

NAN cluster (e.g., NAN cluster 104) devices operating in the master state can be known as master devices. In one example, the master devices propagate synchronization information of the NAN cluster based on periodic transmissions of synchronization beacon frames to other NAN cluster devices. The master devices, for example, also propagate discovery information of the NAN cluster based on periodic transmissions of synchronization beacon frames to other NAN cluster devices.

NAN cluster (e.g., NAN cluster 104) devices operating in the non-master sync state can be known as non-master sync devices. In one example, the non-master sync devices are configured to participate in the propagation of the synchronization beacon frames, but do not generally transmit discovery beacon frames. The need for the non-master sync state stems from the fact that, due to the locations of some devices within the NAN cluster, these devices must be eventually forced to forward synchronization information in order to keep the NAN cluster synchronized.

NAN cluster (e.g., NAN cluster 104) devices in the non-master non-sync state can be known as non-master non-sync devices. The non-master non-sync devices do not generally transmit a both synchronization beacon frames and discovery beacon frames. Larger energy savings may be attained because non-master non-sync devices need not be awake during all DWs and need not monitor communication of beacons during all DWs.

In summary, the anchor master and master devices periodically transmit discovery beacon frames and synchronization beacon frames, non-master sync devices periodically transmit synchronization beacon frames (but not discovery beacon frames), and non-master non-sync devices does not transmit either synchronization beacon frames or discovery beacon frames.

In the NAN cluster 104, each device 102 maintains a corresponding Master Rank (MR). Whether a device acts in an anchor master state, a master state, a non-master sync state, or a non-master non-sync state is based at least on the corresponding MR of the device. In one example, the device 102 in the NAN cluster 104 with the highest MR can become the anchor master.

A device's MR may be determined based on a master preference value, a random factor value and/or the MAC address of the device. The master preference value of a device can be configured, e.g., by a user. In one example, a higher value of the master preference of a device may indicate a higher preference that device may serve as a master or an anchor master. In an example, devices with relatively less stringent battery requirements (e.g., a desktop computer or an access point coupled to an AC power source) can choose relatively high master preference values, while devices with stringent battery requirements (e.g., a smart phone relying on a battery for power) can choose relatively low master preference values. The random factor ensures that two devices with equal master preference value may have equal chance of assuming the master state, e.g., by ensuring that one of the devices may have a higher MR at a first time period, while another of the devices may have a higher MR at a second time period.

Figure 2:
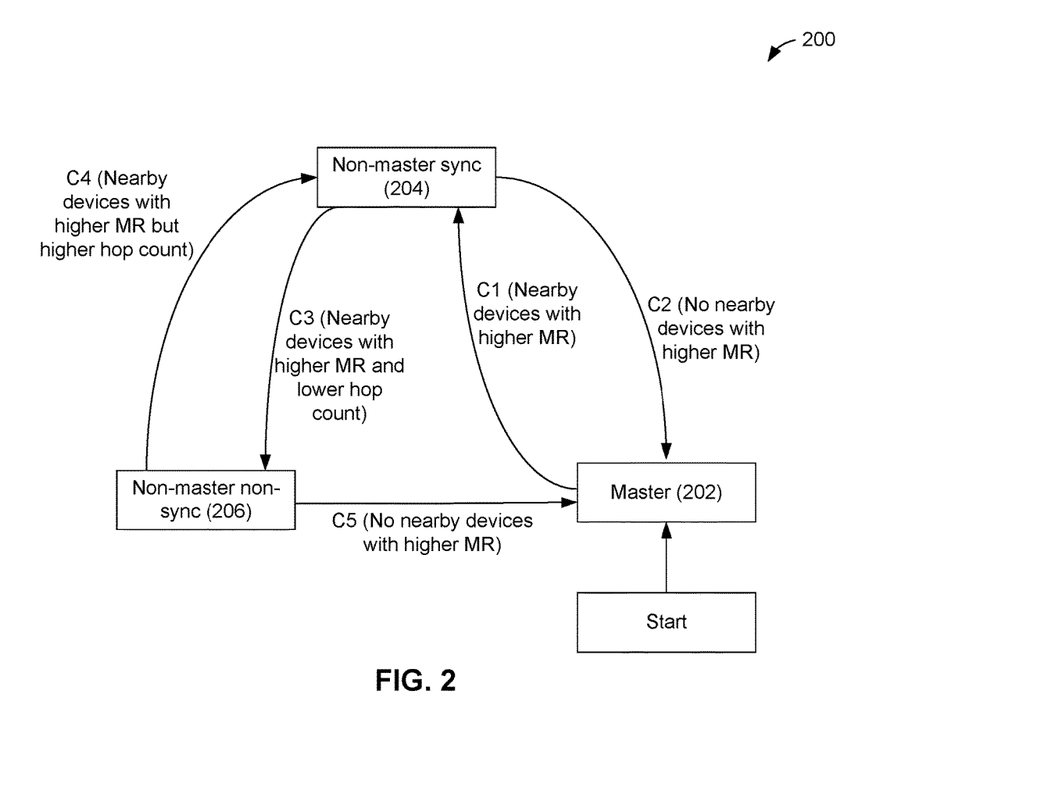
FIG. 2 illustrates a state transition diagram illustrating a transition of a state of a device in a NAN cluster.

FIG. 2 illustrates a state transition diagram 200 illustrating a transition of a state of a device 102, e.g., the device 102e, in the NAN cluster 104 of FIG. 1. As illustrated in FIG. 2, initially, when the device 102e joins the NAN cluster 104, the device 102e assumes the master state 202 (i.e., the device 102e acts as a master device).

When condition C1 is satisfied, the device 102e transitions from the master state 202 to a non-master sync state 204. The condition C1, for example, is satisfied if the device 102e receives a synchronization beacon frame (which has a received signal strength indicator (RSSI) that is higher than a threshold value of RSSI_close) from another device (e.g., device 102f) within the same NAN cluster 104, and the MR of the synchronization beacon frame transmitter is higher than the MR of the device 102e. Additionally or alternatively, the condition C1 is also satisfied if the device 102e receives synchronization beacon frames from three or more devices within the same NAN cluster 104 with RSSI higher than a threshold value of RSSI_middle, and the MR of those three devices are higher than the MR of the device 102e.

The RSSI of a beacon frame may provide an indication of the proximity of the receiver of the beacon frame relative to the transmitter of the beacon frame. For example, the closer is the transmitter to the receiver, the higher is the RSSI. Also, the RSSI_close threshold is higher than the RSSI_middle threshold. In one example, the condition C1 indicates that, if there is another device that is very close to the device 102e (i.e., the RSSI value is higher than the RSSI_close value) and if the another device has a higher MR value (e.g., compared to the MR value of the device 102e), then the device 102e transitions from the master state 202 to the non-master sync state 204. Additionally or alternatively, if there are at least three devices that are somewhat close to the device 102e (e.g., the RSSI value is higher than the RSSI_middle value) and if these devices have higher MR values (e.g., compared to the MR value of the device 102e), then the device 102e transitions from the master state 202 to the non-master sync state 204. In summary, the condition C1 indicates that the device 102e has nearby devices with relatively higher MR (e.g., higher than the MR value of the device 102e), as illustrated in FIG. 2.

When condition C2 is satisfied, the device 102e transitions from the non-master sync state 204 to the master state 202 at an end of a DW. The condition C2, for example, is satisfied if two sub-conditions C2a and C2b are satisfied. The sub-condition C2a is satisfied if the device 102e does not receive any synchronization beacon frames with the RSSI higher than the threshold value of RSSI_close from a device within the same NAN cluster 104, and the MR of the synchronization beacon frame transmitter is higher than the MR of the device 102e. The sub-condition C2b is satisfied if the device 102e receives synchronization beacon frames from less than three devices within the same NAN cluster 104 with RSSI higher than the threshold value of RSSI_middle and the MR of those devices are higher than the MR of the device 102e. The condition C2 can be roughly summarized as the device 102e not having nearby devices with relatively higher MR (e.g., higher than the MR value of the device 102e), as illustrated in FIG. 2.

When condition C3 is satisfied, the device 102e transitions from the non-master sync state 204 to the non-master non-sync state 206 at an end of a DW. The condition C3, for example, is satisfied if at least one of the two sub-conditions C3a and C3b are satisfied. The sub-condition C3a is satisfied if the device 102e (i) receives a synchronization beacon frame with the RSSI higher than the threshold value of RSSI_close from a device within the same NAN cluster 104, and (ii) an anchor master rank (AMR) value of the synchronization beacon frame is equal to the recorded AMR value of the device 102e, and (A) a hop count field value of the synchronization beacon frame transmitter is lower than a hop count field value of the device 102e, or (B) a hop count field value is equal to the hop count field value of the device 102e, and the MR of the synchronization beacon frame transmitter is higher than the MR of the device 102e. The condition C3 can be roughly summarized as the device 102e having nearby devices with relatively higher MR and relatively lower hop count, as illustrated in FIG. 2.

When condition C4 is satisfied, the device 102e transitions from the non-master non-sync state 206 to the non-master sync state 204 at an end of a DW. The condition C4 can be roughly summarized as the device 102e having nearby devices with relatively higher MR but relatively higher hop count, as illustrated in FIG. 2.

When condition C5 is satisfied, the device 102e transitions from the non-master non-sync state 206 to the master state 202 at an end of a DW2. Similar to condition C2, condition C5 can be roughly summarized as the device 102e not having nearby devices with relatively higher MR.

As discussed herein earlier, the devices 102, for example, use the IEEE 802.11 standard to communicate with each other. For example, the devices 102 can communicate in the 2.4 GHz frequency band and/or in the 5 GHz frequency band. In an example, it is mandatory for each of the devices 102 to be able to support and communicate in the 2.4 GHz frequency band, while it is optional for the devices to be able to support and communicate in the 5 GHz frequency band. Thus, all the devices 102 can support and communicate in the 2.4 GHz frequency band, while not all of the devices 102 necessarily support and communicate in the 5 GHz frequency band. Unless otherwise mentioned and for the purposes of this disclosure, a device that can support and communicate in both the 2.4 GHz and 5 GHz frequency bands is also referred to as a dual band device, whereas a device that can support and communicate in the 2.4 GHz frequency band (but does not support communication in the 5 GHz frequency band) is also referred to a single band device (or a 2.4 GHz band device).

In the NAN cluster 104, a master device, an anchor master device and/or a non-master sync device transmit synchronization beacon frames only during a DW. For example, in the NAN cluster 104, in the 2.4 GHz frequency band, the DWs occurs periodically (e.g., every 512 time units (TUs)), and each DW lasts for 16 TUs. Similarly, in the 5 GHz frequency band, the DWs occurs periodically (e.g., every 512 TUs), and each DW lasts for 16 TUs. Also, the DWs for the 2.4 GHz frequency band are offset with respect to the DWs for the 5 GHz frequency band (i.e., a DW for the 2.4 GHz frequency band does not occur simultaneously with a DW for the 5 GHz frequency band). A master device, an anchor master device and/or a non-master sync device can transmit synchronization beacon frames in the 2.4 GHz frequency band during the DWs of the 2.4 GHz frequency band. A master device, an anchor master device and/or a non-master sync device can also transmit synchronization beacon frames in the 5 GHz frequency band during the DWs of the 5 GHz frequency band, e.g., if the device supports communication in the 5 GHz frequency band.

Figure 3:
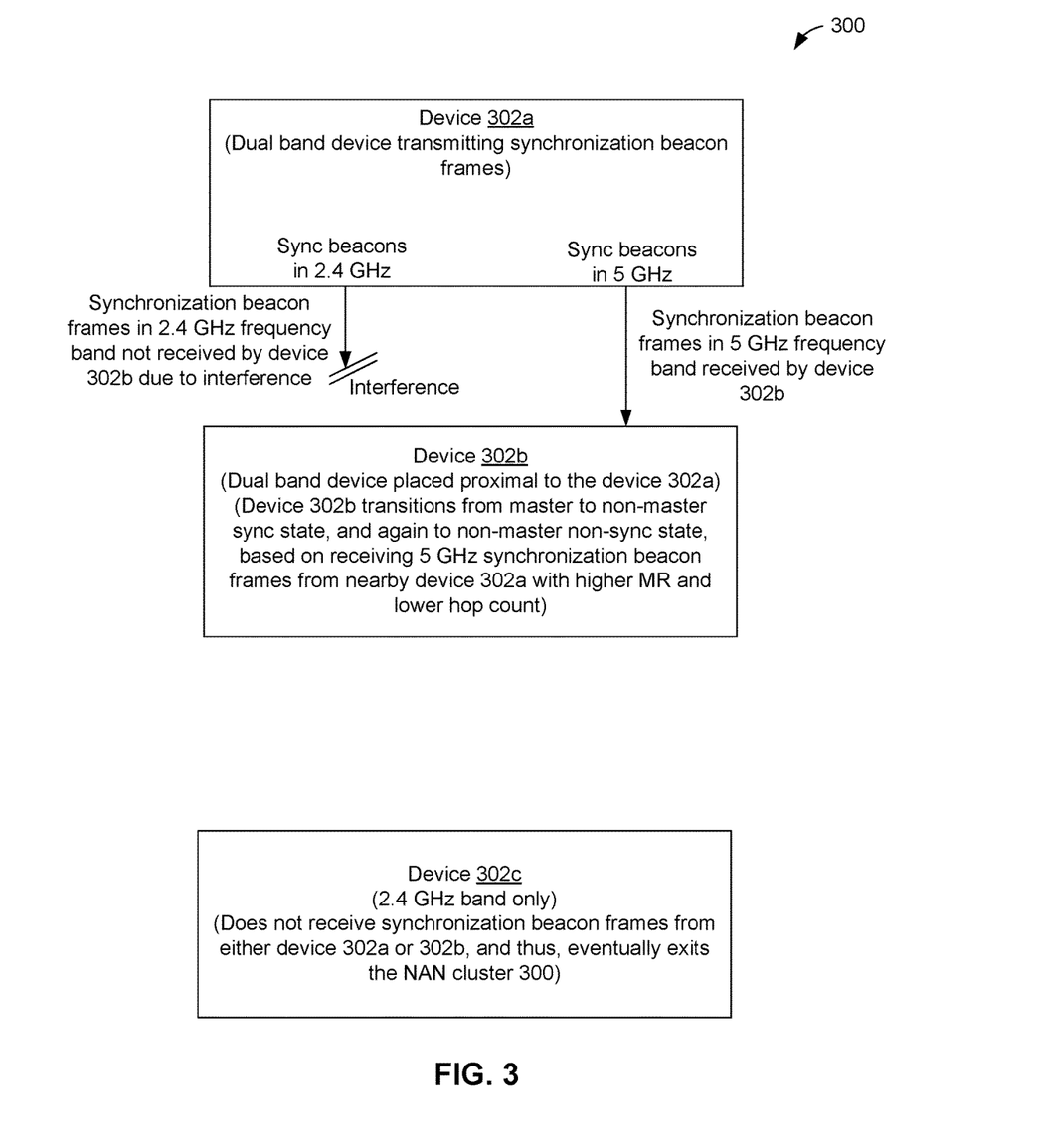
FIG. 3 illustrates a NAN cluster that includes three devices.

FIG. 3 illustrates a NAN cluster 300 that includes three devices 302a, 302b and 302c. Although only three devices are illustrated in FIG. 3, the NAN cluster 300 may include more than three devices.

In FIG. 3, the devices 302a and 302b, for example, are dual band devices, (i.e., they can support communication in the 2.4 GHz and 5 GHz frequency bands). The device 302c, for example, is a single band device that can support communication in the 2.4 GHz frequency band, but not in the 5 GHz frequency band.

The device 302a has a lower hop count and higher MR than the device 302b. For example, the device 302a has a higher master preference value than the device 302b, as a result of which the device 302a has a higher MR than the device 302b. In an example, the device 302a can be the anchor master of the NAN cluster 300, although in another example, the device 302a can be a master device or a non-master sync device. That is, the device 302a transmits synchronization beacon frames.

In FIG. 3, the device 302b is placed close to the device 302a. For example, beacon frames received by the device 302b from the device 302a has relatively high RSSI (e.g., higher than the previously discussed threshold value RSSI_close).

In an example, as the device 302a is a dual band device, the device 302a transmits synchronization beacon frames in both 2.4 GHz frequency band and 5 GHz frequency band. As the device 302b is also a dual band device, the device 302b receives the synchronization beacon frames in the 5 GHz frequency band, as illustrated in FIG. 3.

However, in the example of FIG. 3, the synchronization beacon frames in the 2.4 GHz frequency band transmitted by the device 302a are not received by the device 302b. For example, due to an interference in the 2.4 GHz frequency band, the synchronization beacon frames in the 2.4 GHz frequency band are not received by the device 302b. Such interference in the 2.4 GHz frequency band may be due to a variety of reasons, e.g., another device transmitting in the 2.4 GHz frequency band, a rouge device continually transmitting signals in the 2.4 GHz frequency band, interference from, for example, a device transmitting Bluetooth® signals or other microwave signals, beacon transmission out of a delayed DW due to congestion on the 2.4 GHz channel, and/or the like.

Initially (e.g., when the device 302b is initialized, when the NAN cluster 300 is established, and/or the like), the device 302b acts as a master device, as discussed with respect to FIG. 2. The device 302b receives the synchronization beacon frames in the 5 GHz frequency band from another device (i.e., the device 302a) that is nearby (e.g., the RSSI of the synchronization beacon frames in the 5 GHz frequency band is higher than the threshold value of RSSI_close). Furthermore, the transmitter of the synchronization beacon frames in the 5 GHz frequency band (i.e., the device 302a) has a higher MR and a lower hop count than those of the device 302b. Accordingly, the device 302b transitions to a non-master sync device, and then to a non-master non-sync device, e.g., as discussed with respect to FIG. 2.

As the device 302b transitions to the non-master non-sync state (e.g., based on receiving the synchronization beacon frames in the 5 GHz frequency band), the device 302b does not transmit any synchronization beacon frames (e.g., either in the 2.4 GHz frequency band or in the 5 GHz frequency band). Accordingly, the device 302c does not receive any synchronization beacon frames from the device 302b. It is to be noted that in this example, as the device 302c is a single band device (e.g., can only support 2.4 GHz frequency band operation), the device 302c cannot receive the synchronization beacon frames from the device 302a in the 5 GHz frequency band. Furthermore, the device 302c does not also receive the synchronization beacon frames from the device 302a in the 2.4 GHz frequency band, due to the interference in the 2.4 GHz frequency band.

Thus, the device 302c does not receive any synchronization beacon frames from the devices 302a and 302b. As the device 302c does not receive any synchronization beacon frames from the devices 302a and 302b, after a threshold time (e.g., after about 8 seconds) of receiving the last synchronization beacon frame, the device 302c exits the NAN cluster 300. In an example, if one or more additional devices (not illustrated in FIG. 3) were included in the NAN cluster 300 based on receiving synchronization beacon frames from the device 302c, such additional devices also exit the NAN cluster 300 based on the device 302c exiting the NAN cluster 300. In an example, the device 302c (e.g., along with the one or more additional devices) joins another NAN cluster (not illustrated in FIG. 3), forms a new NAN cluster (not illustrated in FIG. 3), or simply does not participate in any NAN cluster. Thus, the NAN cluster 300 is fragmented and the device 302c (possibly along with the one or more additional devices) is pushed out of the NAN cluster 300.

FIG. 3 illustrates the device 302c exiting the NAN cluster 300 and the NAN cluster 300 fragmenting in two NAN clusters, as a result of the device 302b transitioning to a non-master non-sync state based on receiving synchronization beacon frames only in the 5 GHz frequency band. However, although not illustrated in FIG. 3, multiple devices can also exit the NAN cluster 300 and the cluster 300 can be fragmented in multiple sections, e.g., as a result of one or more devices transitioning to a non-master non-sync state based on receiving synchronization beacon frames only in the 5 GHz frequency band.

Figure 4:
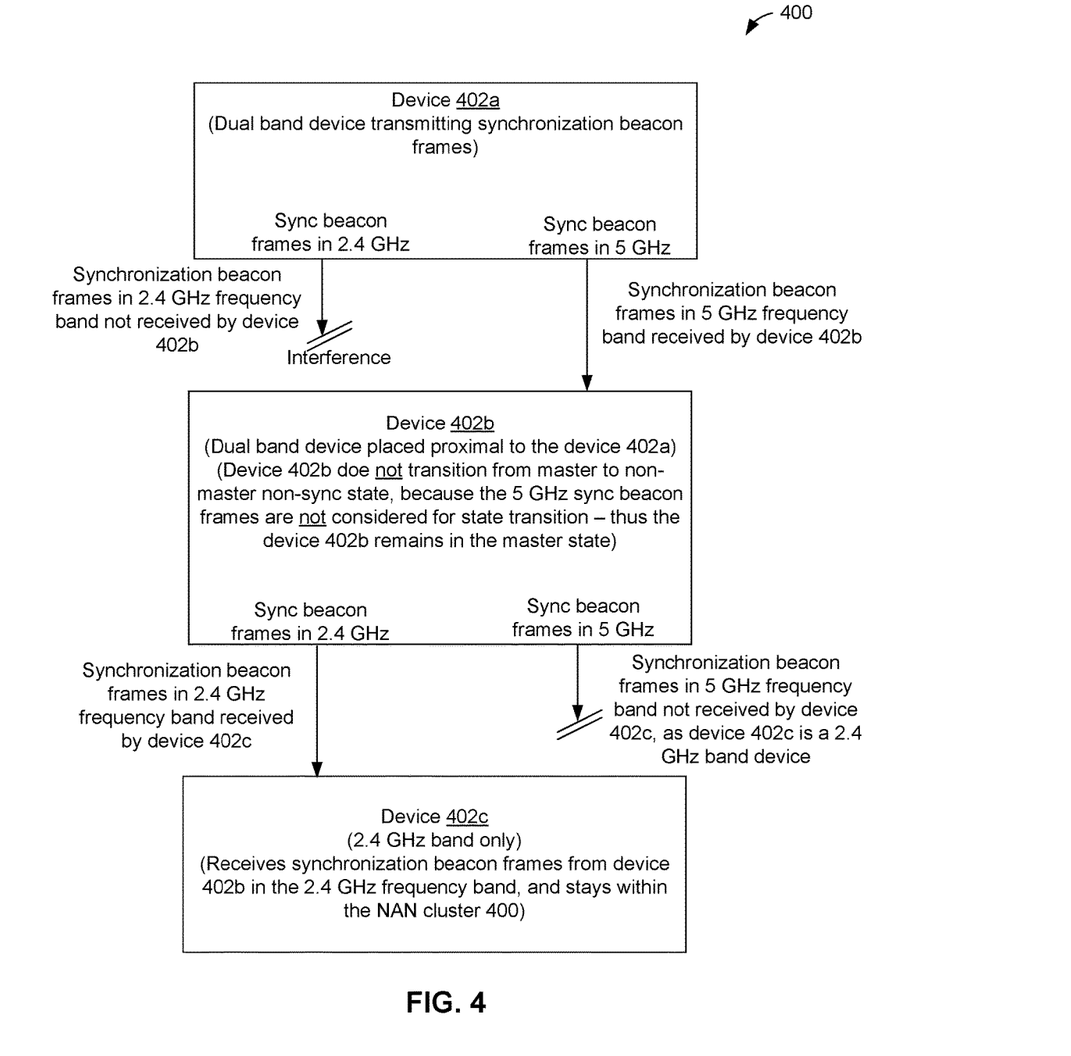
FIG. 4 illustrates a NAN cluster that includes three devices, where a device in the NAN cluster ignores synchronization beacon frames received in the 5 GHz frequency band while determining a transition of the state of the device.

FIG. 4 illustrates a NAN cluster 400 that includes three devices 402a, 402b and 402c. Although only three devices are illustrated in FIG. 4, the NAN cluster 400 may include more than three devices.

Similar to the devices 302a and 302b of FIG. 3, the devices 402a and 402b of FIG. 4 are dual band devices, i.e., can support communication in the 2.4 GHz and 5 GHz frequency bands. Similar to the device 302c of FIG. 3, the device 402c of FIG. 4 is a single band device that can support communication in the 2.4 GHz frequency band (but not the 5 GHz frequency band).

The device 402a has a lower hop count and higher MR than the device 402b. For example, the device 402a has a higher master preference value than the device 402b, as a result of which the device 402a has a higher MR than the device 402b. In an example, the device 402a is the anchor master of the NAN cluster 400, although in another example, the device 402a can be a master device or a non-master sync device. That is, the device 402a transmits synchronization beacon frames.

In FIG. 4, the device 402b is placed close to the device 402a. For example, beacon frames received by the device 402b from the device 402a have relatively high RSSI values (e.g., higher than the previously discussed threshold value of RSSI_close).

In FIG. 4, as the device 402a is a dual band device, the device 402a transmits synchronization beacon frames in both 2.4 GHz frequency band and 5 GHz frequency band. As the device 402b is also a dual band device, the device 402b receives the synchronization beacon frames in the 5 GHz frequency band, as illustrated in FIG. 4. Furthermore, similar to FIG. 3, in the example of FIG. 4, the synchronization beacon frames in the 2.4 GHz frequency band are not received by the device 402b, e.g., due to interference in the 2.4 GHz frequency band.

In FIG. 3, the device 302b transitions to a non-master sync state, and then to a non-master non-sync device, e.g., based on receiving synchronization beacon frames in the 5 GHz frequency band. However, unlike FIG. 3, in FIG. 4, the synchronization beacon frames in the 5 GHz frequency band are ignored (e.g., not relied upon) for purposes of determining the state transition of the device 402b. For example, in FIG. 4, the synchronization beacon frames received in the 5 GHz frequency band are not take into account while determining the transition of a state of a device among the master state, the non-master sync state and the non-master non-sync state. Thus, for the NAN cluster 400 of FIG. 4, the conditions C1-C5 of FIG. 2 take into account synchronization beacon frames received in the 2.4 GHz frequency band, but do not take into account synchronization beacon frames received in the 5 GHz frequency band.

Although the device 402b receives synchronization beacon frames in the 5 GHz frequency band from a proximal or nearby device (i.e., from device 402a) having a lower hop count, the device 402b does not receive any synchronization beacon frames in the 2.4 GHz frequency band from any proximal device. Then conditions C1 and C3 are not satisfied, and the device 402b acts as in the master state (or in the non-master sync state). Unlike the device 302b of FIG. 3, the device 402b of FIG. 4 does not transition to the non-master non-sync state. Being in the master state (or a non-master sync state), the device 402b transmits synchronization beacon frames in the 2.4 GHz frequency band, and also possibly in the 5 GHz frequency band.

As the device 402c is a single band device, the device 402c does not receive any synchronization beacon frames in the 5 GHz frequency band. Also, the device 402c does not receive any synchronization beacon frames in the 2.4 GHz frequency band from the device 402a, due to the interference in this frequency band. However, the device 402c receives synchronization beacon frames in the 2.4 GHz frequency band from the device 402b, and remains in the NAN cluster 400. Unlike the device 302c of FIG. 3, the device 402c of FIG. 4 does not exit the NAN cluster 400 and the NAN cluster 400 is not fragmented. This is possible because the device 402b refrains from using the synchronization beacon frames in the 5 GHz frequency band for purposes of determining the state transition of the device 402b.

In an example, although the device 402b ignores synchronization beacon frames in the 5 GHz frequency band for purposes of determining state transition (e.g., does not take into consideration the synchronization beacon frames received in the 5 GHz frequency band for purposes of determining state transition), the synchronization beacon frames in the 5 GHz frequency band are utilized by the device 402b for many other purposes. For example, the device 402b (and any other dual band devices in the NAN cluster 400) utilizes the synchronization beacon frames in the 5 GHz frequency band for synchronizing with the anchor master, for selecting an anchor master for the NAN cluster 400 (e.g., for possibly selecting the device 402b as the anchor master), for other functions described in the NAN protocol, and/or the like.

Figure 5:
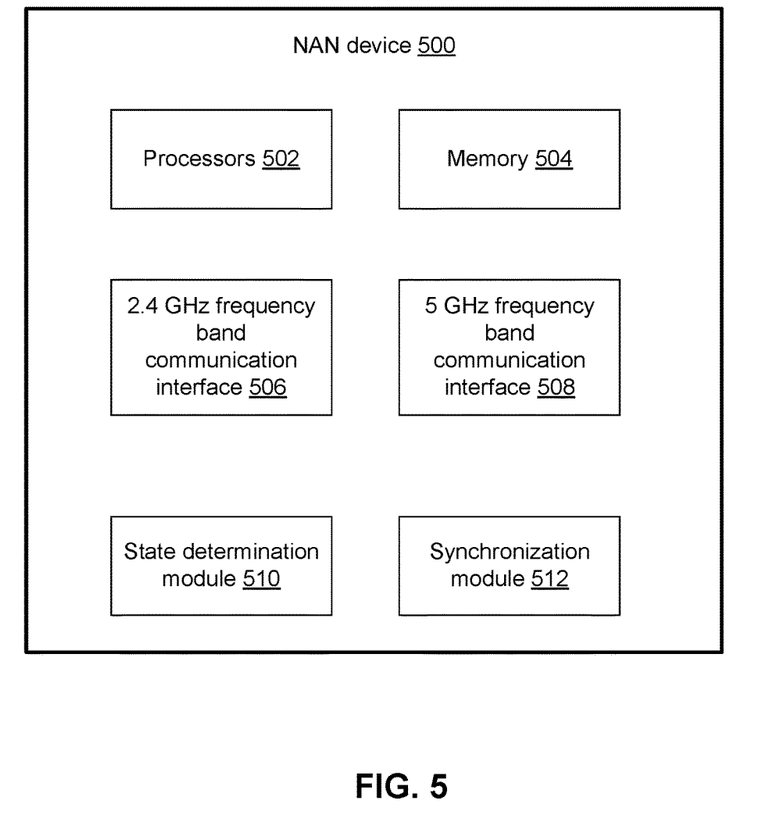
FIG. 5 schematically illustrates a NAN device.

FIG. 5 schematically illustrates a NAN device 500. In an example, the NAN device 500 is a dual band device included in the cluster 400 of FIG. 4. The NAN device 500 is, for example, similar to the device 402b of FIG. 4 (or any other NAN devices discussed in this disclosure).

In an example, the NAN device 500 is a Wi-Fi capable device supporting all required NAN protocol mechanisms. For example, the NAN device 500 can be any computing device that can participate in a NAN network, e.g., a cellular phone, a smart phone, a laptop, a desktop, a handheld computing device, an access point, and/or any other consumer electronic device. The NAN device 500, for example, uses the IEEE 802.11 standard to communicate with other NAN devices. For example, the NAN device 500 can communicate with another NAN device in a NAN cluster over a first communication channel and a second communication channel, where the first communication channel comprises the 2.4 GHz frequency band and the second communication channel comprises the 5 GHz frequency band.

In an example, the NAN device 500 comprises processors 502 and a memory 504. Memory 504 is an example of computer storage media (e.g., memory storage device) for storing instructions which are executed by the processors 502 to perform the at least some of the functions described herein above. For example, memory 504 may generally include both volatile memory and non-volatile memory (e.g., RAM, ROM, or the like) devices, hard disk drives, solid-state drives, removable media, including external and removable drives, memory cards, flash memory, floppy disks, optical disks (e.g., CD, DVD), a storage array, a network attached storage, a storage area network, or the like. The memory 504 may be referred to as computer storage media herein, and may be a media capable of storing computer-readable, processor-executable program instructions as computer program code that can be executed by the processors 504 as a particular machine configured for carrying out at least some of the operations and functions described in the implementations herein.

The processors 502 may comprise one or more hardware devices (e.g., integrated circuits) that may include a single processing unit or a number of processing units, all or some of which may include single or multiple computing units or multiple cores. The processors 502 can be implemented as one or more microprocessors, microcomputers, microcontrollers, digital signal processors, central processing units, state machines, logic circuitries, and/or any devices that manipulate signals based on operational instructions.

The NAN device 500 also comprises a 2.4 GHz frequency band communication interface 506 and a 5 GHz frequency band communication interface 508. However, in another example and although not illustrated in FIG. 5, if the NAN device 500 is a single band device (i.e., supports communication in the 2.4 GHz frequency band, but does not support communication in the 5 GHz frequency band), then the 5 GHz frequency band communication interface 508 would not be present in the NAN device 500.

In an example, the 2.4 GHz frequency band communication interface 506 transmits and/or receives beacon frames (e.g., discovery beacon frames and synchronization beacon frames) and other data packets in the 2.4 GHz frequency band. Similarly, the 5 GHz frequency band communication interface 508 transmits and/or receives beacon frames (e.g., discovery beacon frames and synchronization beacon frames) and other data packets in the 5 GHz frequency band.

The NAN device 500 also comprises a state determination module 510 and a synchronization module 512. The state determination module 510, for example, determines a state of the NAN device 500, and if necessary, transitions the state of the NAN device 500, e.g., as discussed with respect to FIGS. 2 and 4. As discussed with respect to FIG. 4, in an example, the NAN device 500 ignores synchronization beacon frames received in the 5 GHz frequency band for purposes of determining state transition, and relies of synchronization beacon frames in the 2.4 GHz frequency band for purposes of determining the state transition.

The synchronization module 512 synchronizes the clock of the NAN device 500 with that of an anchor master in order to maintain the DWs of the NAN device 500 aligned and be able to exchange service discovery frames. In an example, the NAN device 500 relies on synchronization beacon frames received in both the 2.4 GHz and 5 GHz frequency bands for purposes of synchronization.

Although the NAN device 500 may have many other components, these components are not illustrated in FIG. 5 for purposes of illustrative clarity. For example, although not illustrated in FIG. 5, the NAN device 500 also includes a display screen and/or one or more other communication interfaces, e.g., which may facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. In another example, although not illustrated in FIG. 5, the NAN device 500 may also include one or more input/output devices that may receive various inputs from a user and provide various outputs to the user, and may include a keyboard, a remote controller, a mouse, a printer, audio input/output devices, and so forth.

Figure 6:
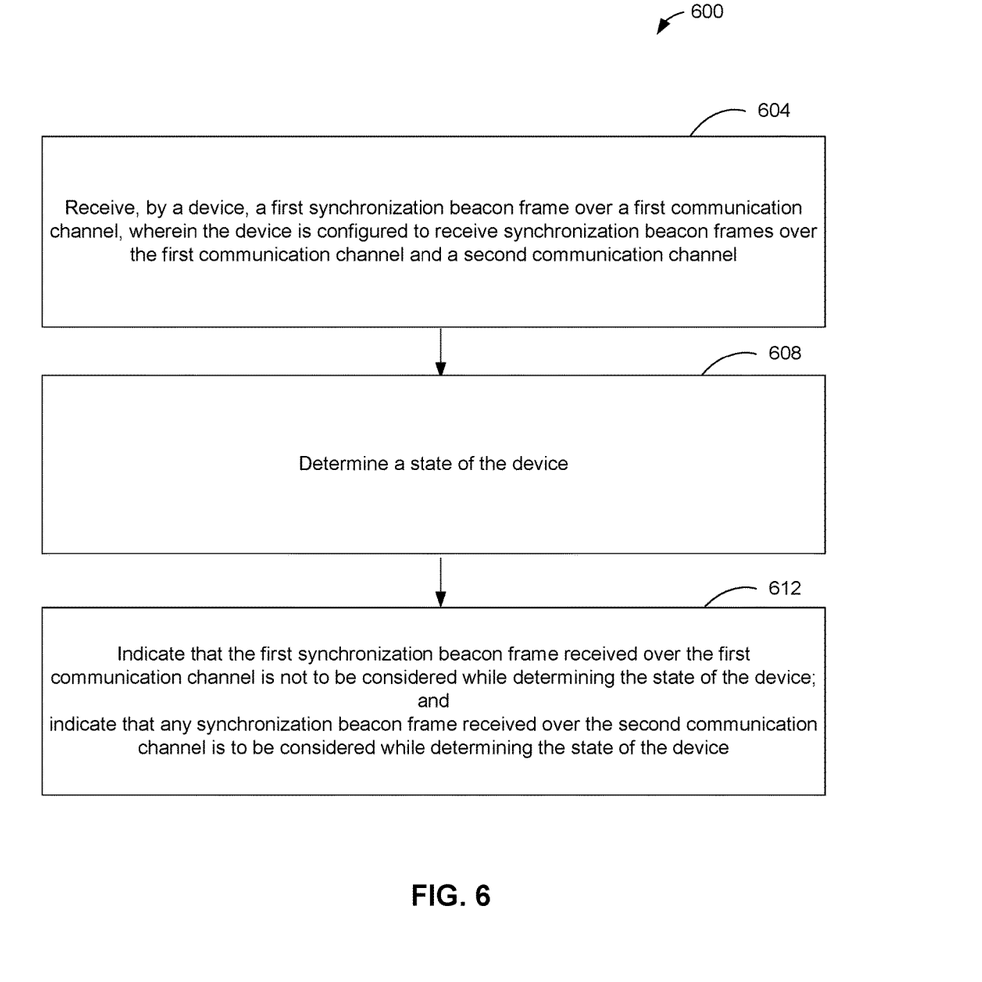
FIG. 6 illustrates a flow diagram of an example method for operating a NAN cluster comprising a plurality of devices, where a device in the NAN cluster ignores synchronization beacon frames received in the 5 GHz frequency band while determining a transition of the state of the device, thereby preventing potential fragmentation of the NAN cluster.

FIG. 6 illustrates a flow diagram of an example method 600 for operating a NAN cluster (e.g., NAN clusters 104 and 400 of FIGS. 1 and 4) comprising a plurality of devices. In method 600, a device in the NAN cluster ignores synchronization beacon frames received in the 5 GHz frequency band while determining a transition of state of the device in the NAN cluster, thereby preventing potential fragmentation of the NAN cluster.

At 604, a device (e.g., the device 402b of FIG. 4) receives a synchronization beacon frame over a first communication channel. In an example, the device participates in the NAN cluster. In an example, the device is configured to receive synchronization beacon frames over the first communication channel and a second communication channel. In an example, the first communication channel comprises the 5 GHz frequency band, and the second communication channel comprises the 2.4 GHz frequency band.

At 608, a state of the device is determined. The state of the device, for example, comprises one of (i) a master state, (ii) a non-master sync state, or (iii) a non-master non-sync state. The state of the device is determined, e.g., as discussed with respect to FIG. 2. At 612, the device indicates that the the first synchronization beacon frame received over the first communication channel is not to be considered while determining the state of the device, e.g., as discussed with respect to FIG. 4. For example, the device ignores (e.g., does not take into account) the first synchronization beacon frame received over the first communication channel (e.g., as received in 604 of FIG. 6) while determining the state of the device. For example, while determining the conditions C1-C5 of FIG. 2 in determining the state of the device, the first synchronization beacon frame received over the first communication channel is not taken in account. Also at 612, the device indicates that any synchronization beacon frame received over the second communication channel is to be considered while determining the state of the device, e.g., as discussed with respect to FIG. 4. For example, the device does not ignore (e.g., takes into account) any synchronization beacon frame received over the second communication channel while determining the state of the device. For example, while determining the conditions C1-C5 of FIG. 2 in determining the state of the device, any synchronization beacon frame received over the second communication channel is taken in account. As discussed with respect to FIG. 4, ignoring the first synchronization beacon frame received over the first communication channel, while determining the state of the device, prevents potential fragmentation of the NAN cluster.

The description may use the phrases "in an embodiment," or "in embodiments," which may each refer to one or more of the same or different embodiments. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
    receiving, via a wireless transceiver of a first device, a first synchronization beacon frame transmitted by a second device in a first frequency band, the first synchronization beacon configured to enable the first device to synchronize communications with the second device in accordance with a wireless network with which the first device, the second device, and a third device are associated;
    determining, by the first device, a communication state of the first device based on the first synchronization beacon frame received from the second device;
    receiving, via the wireless transceiver of the first device, a second synchronization beacon frame transmitted by the second device in a second frequency band;
    determining, responsive to the second synchronization beacon frame being received in the second frequency band, that the second synchronization beacon is to be disregarded during a subsequent determination of the communication state of the first device;
    maintaining, by the first device, the communication state of the first device by disregarding the second synchronization beacon frame during the subsequent determination of the communication state; and
    transmitting, by the first device and based on the communication state of the first device, a third synchronization beacon frame to a third device in the first frequency band, the third synchronization beacon frame effective to enable the third device to remain associated with the wireless network.

2. The method of claim 1, wherein the communication state of the first device comprises a master state or a non-master sync state for administration of the wireless network.

3. The method of claim 2, wherein the second synchronization beacon frame comprises information configured to cause the first device to transition to a non-master non-sync state when used for communication state determinations.

4. The method of claim 3, wherein the information of the second synchronization beacon comprises (i) a received signal strength indicator (RSSI) value that is higher than a predefined threshold value and (ii) an indicated master rank (MR) of the second device that is higher than an MR of the first device.

5. The method of claim 1, wherein the wireless network comprises a Neighbor Awareness Networking (NAN) cluster.

6. The method of claim 1, further comprising:
    synchronizing, by the first device, a communication timing system of the first device with a communication timing system of the second device based on the first synchronization frame; and
    synchronizing, by the first device, the communication timing system of the first device with a communication timing system of the third device based on the third synchronization beacon frame.

7. The method of claim 1, wherein the respective communication timing system of the first device, second device, or third device comprises a clock source by which:
    network synchronization is maintained for alignment of discovery windows; or
    a time synchronization function is implemented.

8. The method of claim 1, wherein prior to transmission of the third synchronization beacon frame, the third device has not received the first synchronization beacon frame or second synchronization beacon frame transmitted by the second device.

9. The method of claim 1, wherein the first frequency band comprises a 2.4 GHz frequency band and the second frequency band comprises a 5 GHz frequency band.

10. A device comprising:
    a hardware-based processor;
    a wireless transceiver configured to communicate over a first frequency band or a second frequency band;

a hardware-based memory containing instructions that, responsive to execution by the hardware-based processor, implement operations comprising:

receiving, via the wireless transceiver, a first synchronization beacon frame transmitted by a first remote device in a first frequency band, the first synchronization beacon configured to enable the device to synchronize communications with the first remote device in accordance with a wireless network with which the device, the first remote device, and a second remote device are associated;

establishing a communication state of the device based on the first synchronization beacon frame received from the first remote device;

receiving, via the wireless transceiver, a second synchronization beacon frame transmitted by the first remote device in a second frequency band;

determining that the second synchronization beacon is not to be used for a communication state determination of the device based on the second synchronization beacon frame being transmitted in the second frequency band;

maintaining the communication state of the device during the communication state determination by not considering the second synchronization beacon frame; and transmitting, based on the communication state of the device, a third synchronization beacon frame to the second remote device in the first frequency band, the third synchronization beacon frame effective to enable the second remote device to remain associated with the wireless network.

11. The device of claim 10, wherein the communication state of the device comprises a master state or a non-master sync state.

12. The device of claim 11, wherein the second synchronization beacon frame comprises information that would cause the device to transition to a non-master non-sync state if the second synchronization beacon frame were used for the communication state determination.

13. The device of claim 12, wherein the information comprises a received signal strength indicator (RSSI) of the second synchronization beacon frame that is higher than a threshold value and (ii) a master rank (MR) of the first remote device is higher than an MR of the device.

14. The device of claim 10, wherein the wireless network comprises a Neighbor Awareness Networking (NAN) cluster.

15. The device of claim 10, wherein the operations further comprise:

synchronizing with the first remote device based on the first synchronization frame; and synchronizing with the second remote device based on the third synchronization beacon frame.

16. The device of claim 10, wherein prior to transmission of the third synchronization beacon frame, the second remote device has not received the first synchronization beacon frame or second synchronization beacon frame transmitted by the first remote device.

17. The device of claim 10, wherein the first frequency band comprises a 2.4 GHz frequency band and the second frequency band comprises a 5 GHz frequency band.

18. A hardware-based memory containing instructions that, responsive to execution by a hardware-based processor of a first device, cause the hardware-based processor to:

receive, via a wireless transmitter, a first synchronization beacon frame transmitted by a second device in a first frequency band, the first synchronization beacon usable to synchronize communications with the second device in accordance with a wireless network with which the first device, the second device, and a third device are associated;

determine a communication state of the first device based on the first synchronization beacon frame received from the second device;

receive, via the wireless transmitter, a second synchronization beacon frame transmitted by the second device in a second frequency band;

determine, responsive to the second synchronization beacon frame being received in the second frequency band, that the second synchronization beacon is to be disregarded during a subsequent determination of the communication state;

maintain the communication state of the first device by disregarding the second synchronization beacon frame during the subsequent determination of the communication state; and transmit based on the communication state, a third synchronization beacon frame to a third device in the first frequency band, the third synchronization beacon frame effective to enable the third device to remain associated with the wireless network.

19. The hardware-based memory of claim 18, wherein the second synchronization beacon frame comprises information that would cause a transition to a non-master non-sync state if the second synchronization beacon frame were used for the communication state determination.

20. The hardware-based memory of claim 18, wherein:

the wireless network comprises a Neighbor Awareness Networking (NAN) cluster; or the first frequency band comprises a 2.4 GHz frequency band and the second frequency band comprises a 5 GHz frequency band.

* * * * *